United States Patent
Radmanic

(10) Patent No.: US 6,799,796 B2
(45) Date of Patent: Oct. 5, 2004

(54) SLIDING BLOCK GUIDE FOR OPENABLE MOTOR VEHICLE ROOVES OR MOTOR VEHICLE HATCHES

(75) Inventor: Stjepan Radmanic, Mammendorf (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/636,557

(22) Filed: Aug. 8, 2003

(65) Prior Publication Data

US 2004/0032150 A1 Feb. 19, 2004

(30) Foreign Application Priority Data

Aug. 13, 2002 (DE) .......................................... 102 37 092

(51) Int. Cl.⁷ .............................................. B60J 7/057
(52) U.S. Cl. ................................. 296/216.08; 296/223
(58) Field of Search ........................... 296/216.08, 223; 384/42

(56) References Cited

U.S. PATENT DOCUMENTS

| | | | | |
|---|---|---|---|---|
| 4,114,945 A | * | 9/1978 | Lutz | ............................ 16/93 R |
| 4,923,245 A | * | 5/1990 | Kuwabara | .................... 296/214 |
| 4,984,332 A | | 1/1991 | Bienert et al. | |
| 5,344,209 A | * | 9/1994 | Regner | ......................... 296/223 |
| 6,568,750 B2 | | 5/2003 | Radmanic et al. | |

FOREIGN PATENT DOCUMENTS

| | | | |
|---|---|---|---|
| DE | 31 35 741 A1 | 5/1982 | |
| DE | 3813049 | * 11/1989 | ............ 296/216.04 |
| DE | 4107129 | * 6/1992 | |
| DE | 43 36 222 C1 | 11/1994 | |
| DE | 197 14 432 C1 | 9/1998 | |
| DE | 100 33 887 C1 | 8/2001 | |
| DE | 100 46 129 A1 | 4/2002 | |
| EP | 0 403 738 A2 | 12/1990 | |

* cited by examiner

Primary Examiner—Dennis H. Pedder
(74) Attorney, Agent, or Firm—Nixon Peabody LLP; David S. Safran

(57) ABSTRACT

Sliding block guide for openable motor vehicle roofs or vehicle hatches, with a guideway (12) which has a guide channel (40), and a sliding block (11) which is movably guided in the guide channel along the guideway and which has a rubber-elastic sliding block body (20) and a sliding cap (26) which is seated on the sliding block body. A carrier part (15) is inserted into the rubber-elastic sliding block body (20), this carrier part (115) having greater strength and stiffness than the sliding block body and being pivotally supported on a support pin(13).

20 Claims, 6 Drawing Sheets

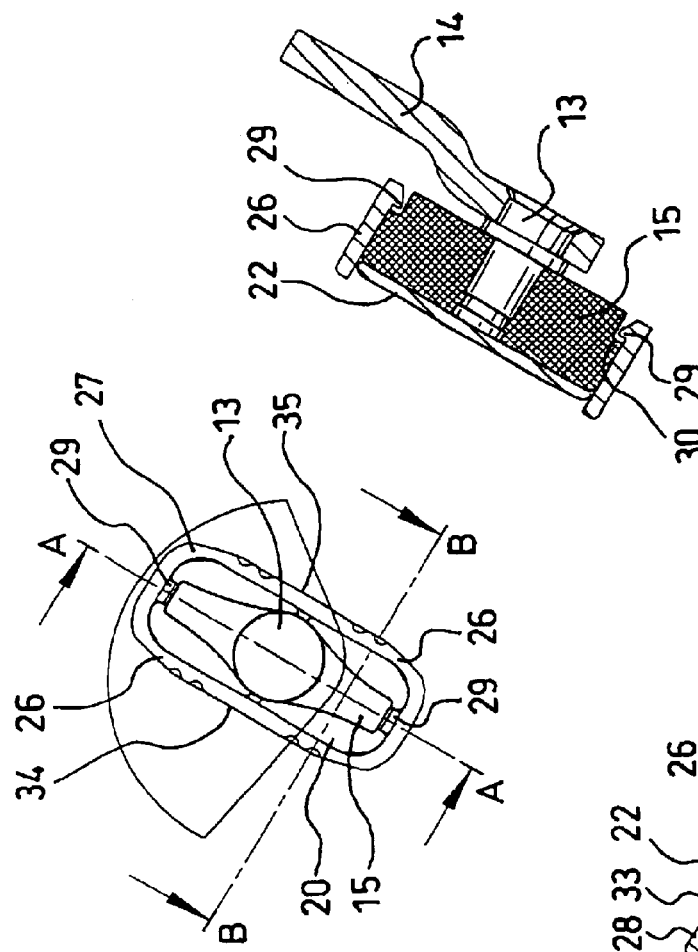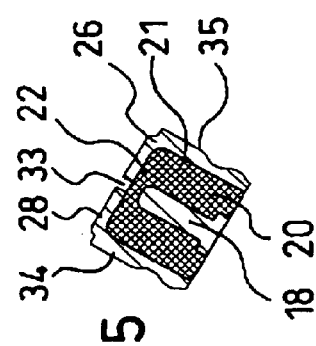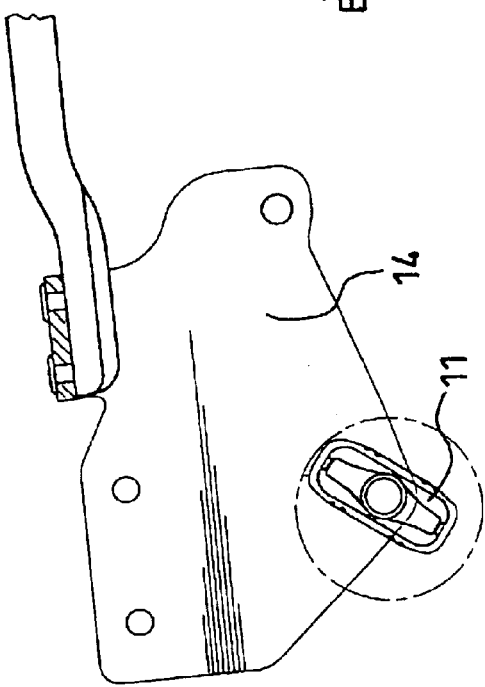

SLIDING BLOCK GUIDE FOR OPENABLE MOTOR VEHICLE ROOVES OR MOTOR VEHICLE HATCHES

BACKGROUND OF THE INVENTION

1. Field of the Invention

The invention relates to a sliding block guide for openable motor vehicle roofs, with a guideway which has a guide channel, and a sliding block which is movably guided in the guide channel along the guideway, and which has a rubber-elastic sliding block body and a sliding cap which is seated on the sliding block body.

2. Description of Related Art

Sliding block guides of the above mentioned type are known from, for example, German Patent DE 43 36 222 C1 and published European Patent Application EP 0 403 738 A2 and corresponding U.S. Pat. No. 4,984,332. In these known sliding block guides, the rubber-elastic sliding block body is provided with a lengthwise groove into which a foot of the sliding block carrier is inserted. Sliding block guides are used not only for straight guideways, but also often for those with curved areas, as is known, for example, from German Patent DE 100 33 887 C1 and corresponding U.S. Pat. No. 6,568,750. However, the known sliding blocks can handle curves only to a limited degree. In the curve area, contact pressures are relatively high and deformation of the sliding block is great. In particular, for a high weight of the vehicle part which is to be moved, for example, a cover, this is associated with high wear. This wear leads to unwanted play of the slider in its guide channel, and thus, to rattling of the system when there is unevenness in the roadway and with the resulting impacts on the vehicle.

SUMMARY OF THE INVENTION

A primary object of this invention is to devise a sliding block guide which has low wear over the service life of the system and which provides for the absence of rattling in an especially effective manner.

This object is achieved in accordance with the invention in that, in a sliding block guide of the initially mentioned type, a carrier part is inserted in the rubber-elastic sliding block body which has higher strength and stiffness than the sliding block body, and is pivotally supported for its part on the support pin.

The sliding block guide in accordance with the invention is characterized by improved curve handling capacity with reduced wear. It avoids or reduces at least unwanted rattling noise.

The carrier part can be made of high-strength plastic or of metal. Preferably, the support pin is made of metal and is spray-coated with the plastic which forms the carrier part so that the carrier part can turn without play on the support pin from the start. But optionally the carrier part can also be sprayed separately and can be clipped onto the support pin.

The carrier part for highly loadable support of the sliding block body and the sliding cap can have a hub which surrounds the carrier pin and two wings which project essentially radially from opposite sides of the hub.

The sliding block body is preferably made essentially cap-shaped with a peripheral wall and an end wall which adjoins one side of the peripheral wall and is slotted in the area of its peripheral wall, the slots extending feasibly in the lengthwise direction of the sliding block and/or in the transverse direction of the sliding block.

The sliding block can have an essentially cuboidal shape and is made mirror-symmetrical both in the lengthwise direction and also in the transverse direction.

The sliding cap is preferably clipped onto the carrier part, and in the interest of high stability, is connected essentially without play to the carrier part in the lengthwise direction of the sliding block. For the carrier part, it can have especially a peripheral wall, with the carrier part resting against its inside in the area of the narrow sides of the sliding block, since tolerance equalization is unnecessary in the lengthwise direction of the sliding block.

However, preferably, the sliding cap is elastically movable for especially effective tolerance equalization with reference to the carrier part, both in the transverse direction of the sliding block and also in the rotary direction around the axis of the support pin. Here, the sliding block can have a peripheral wall, from the inside of which the carrier part lies at a distance in the area of the lengthwise sides of the sliding block.

The rubber elastic sliding block body, advantageously, occupies essentially the entire space between the carrier part and the sliding cap.

The sliding surfaces of the sliding cap which slide-engage the walls of the guide channel, preferably, as is known from German Patent DE 4336222 C1, integrate stripping lips which run obliquely relative to the displacement direction and eliminate dirt particles which can have penetrated into the sliding block guide during operation.

In another embodiment of the invention, in the area of the curves of the guideway, the guide channel is wider than in the area of the straight guideway sections. The curve handling capacity of the sliding block in curved guideways is thus additionally improved. The widening of the guide channel in the curve areas of the guideway is dimensioned such that the sliding block conforms to the guide channel walls essentially without deformation when these curve areas are traversed.

The invention is explained in detail below with reference to the accompanying drawings by way of example.

BRIEF DESCRIPTION OF THE DRAWINGS

FIG. 2 is a side view of the sliding block of FIG. 1 and the support which bears the sliding block, FIG. 3 shows, on a larger scale, a detailed view of the broken line encircled part of FIG. 2, FIG. 4 is a sectional view taken along line A—A of FIG. 3, FIG. 5 is a sectional view taken along line B—B of FIG. 3.

DETAILED DESCRIPTION OF THE INVENTION

Figure 1:
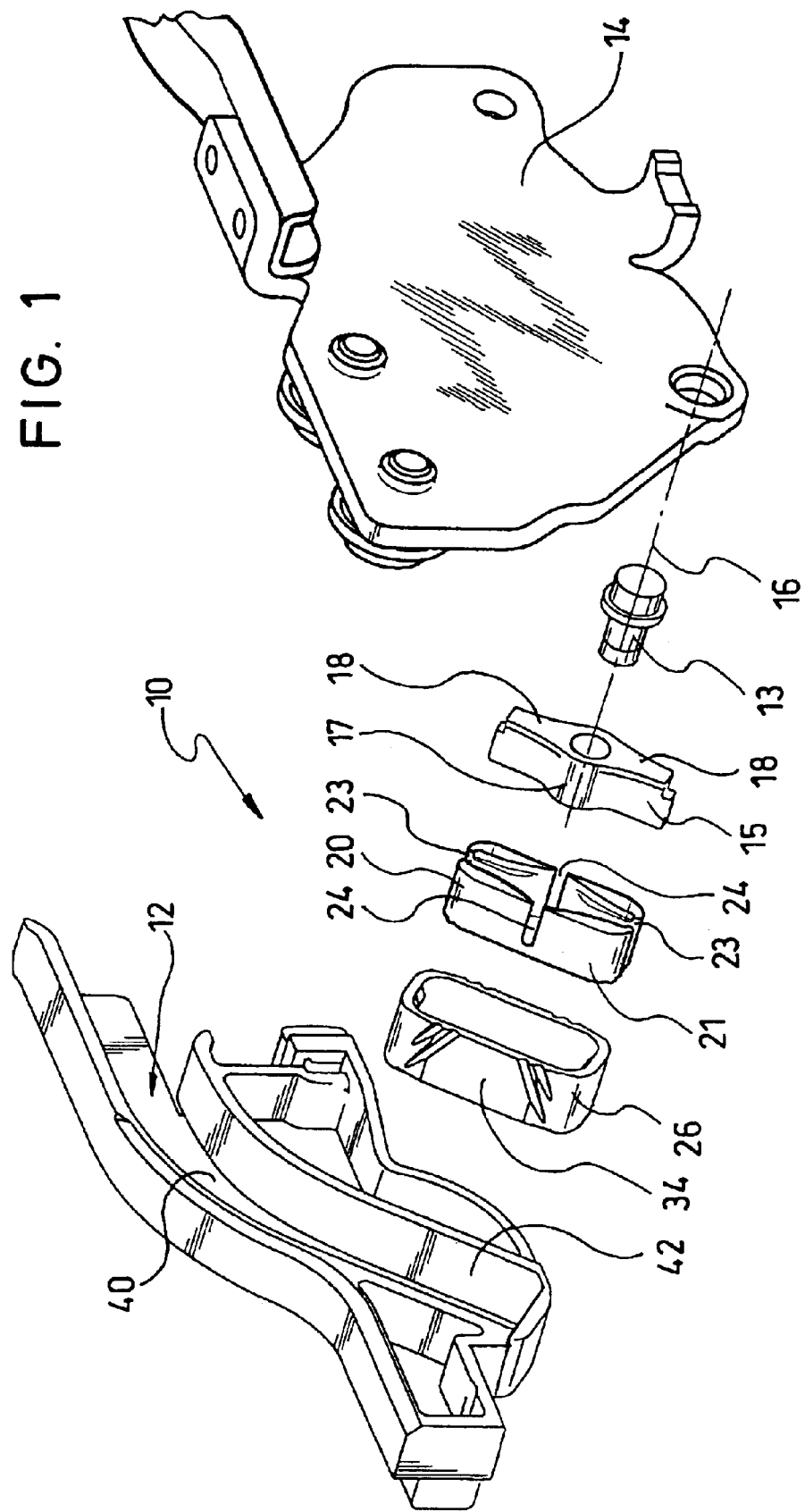
FIG. 1 is an exploded view of a sliding block guide in accordance with the invention.
Figure 6:
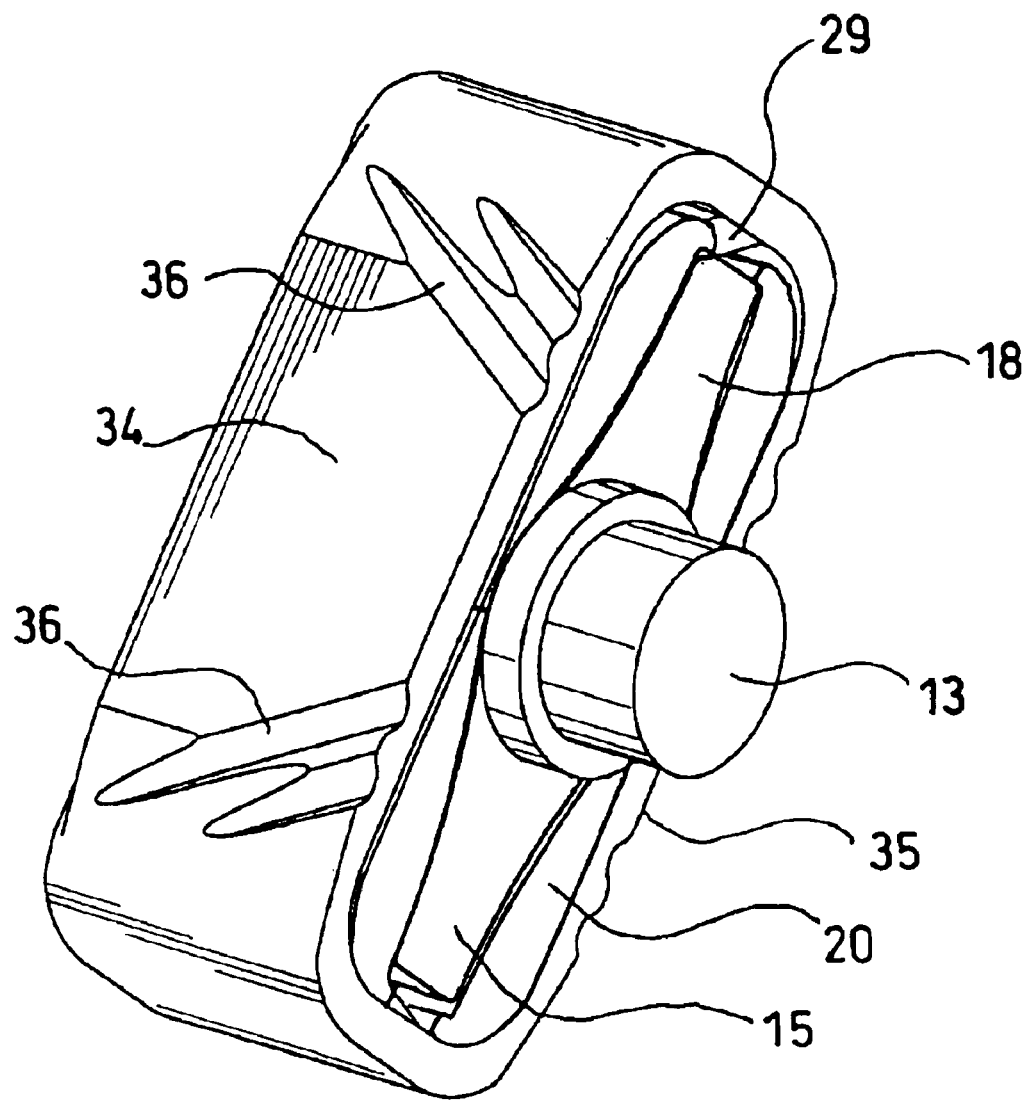
FIG. 6 is a perspective view of the sliding block on a still larger scale.
Figure 8:
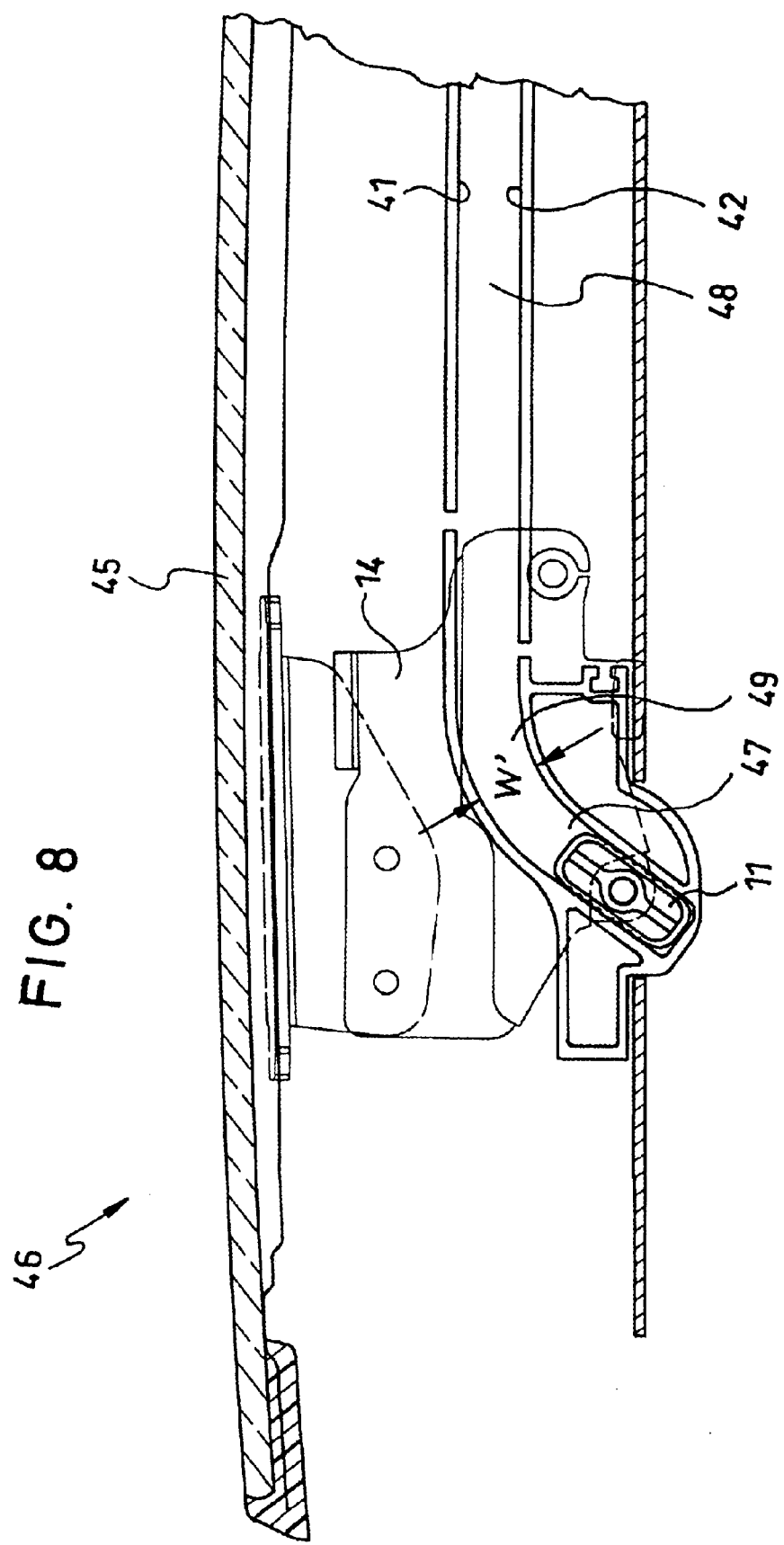
FIG. 8 shows a partial view of an openable motor vehicle roof equipped with the sliding block guide as shown in FIGS. 1 to 7 with the cover in the closed position, and FIG. 9 a partial view similar to that shown in FIG. 8 but with the cover raised.
Figure 9:
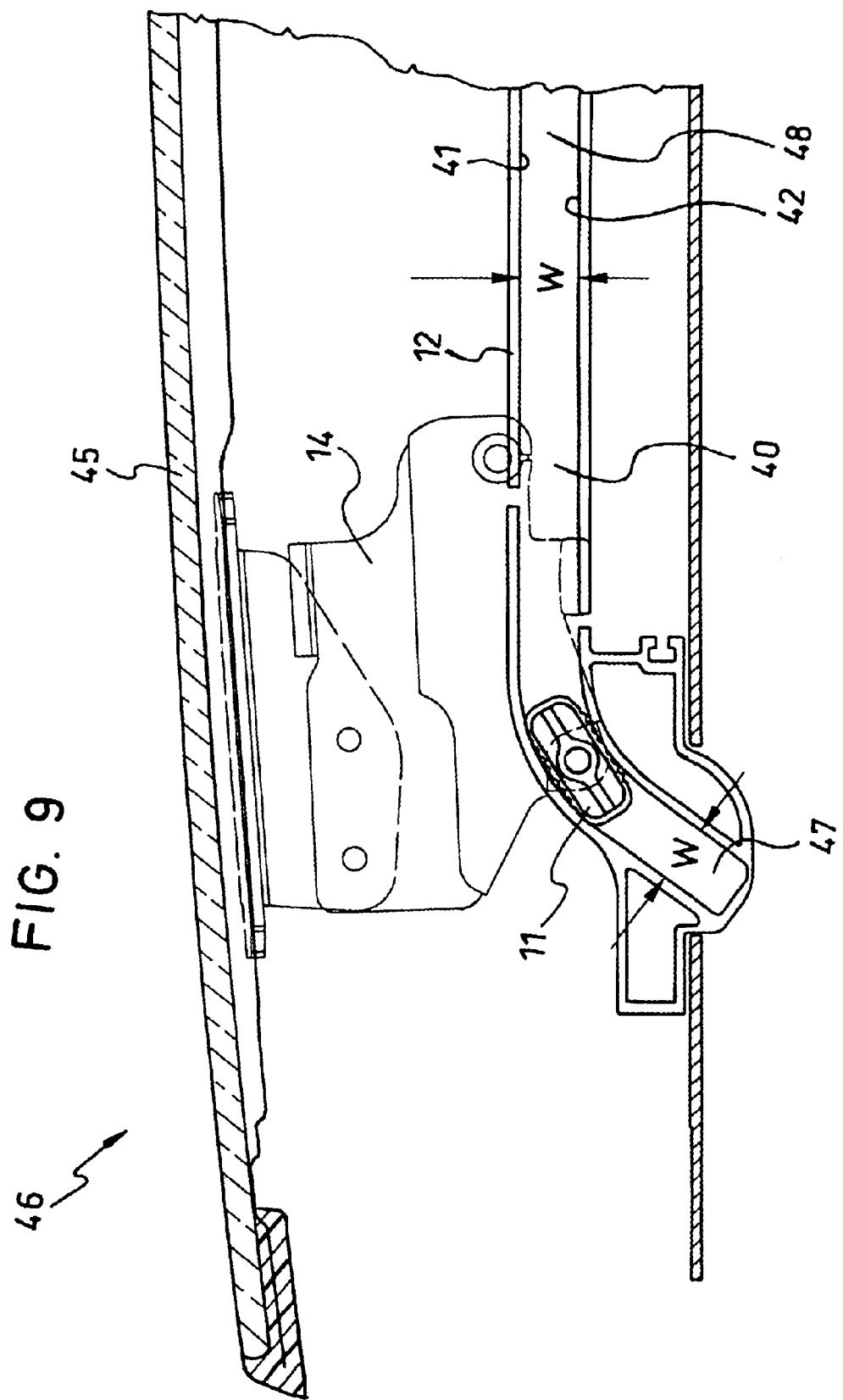

FIGS. 1, 8 and 9 show an embodiment of a sliding block guide 10 in an application for the front lifting and sliding mechanism of the motor vehicle roof known from German Patent DE 100 33 887 C1 and corresponding U.S. Pat. No. 6,568,750. However, it goes without saying that the sliding block guide of the present invention can also be advantageously used for any other mechanism for actuating an openable motor vehicle roof or for a mechanism for actuating a motor vehicle hatch.

The sliding block guide 10 includes a multi-part, essentially rectanguloidal sliding block 11 and a guideway 12. The sliding block 11 is made essentially mirror symmetrical with respect both to the lengthwise axis and also the transverse axis, and it has a preferably metallic support pin 13. The support pin 13 is attached, for example, riveted, to a support 14 which is likewise metallic in this embodiment. On the support pin 13, a carrier part 15 is supported to be able to turn around the axis 16 of the support pin 13. The carrier part 15 can be made of high strength plastic and can be produced, for example, directly by injection around the support pin 13. This has the advantage that the injection molded plastic carrier part can turn without play on the support pin 13, and thus, is free of rattling without further effort. However, the plastic carrier part can also be injection molded separately, and then, can be clipped onto the support pin 13. In particular, if the sliding block guide 10 is intended for very high stresses, the carrier part 15 can also be made of metal and can be slipped onto the carrier pin 13. The carrier part 15 has a hub 17 which surrounds the support pin 13 and has two wings 18 which project essentially radially outward from the sides of the hub 17 which are diametrically opposite one another.

A rubber-elastic sliding block body 20, which is can be made of rubber, is slipped onto the carrier part 15. The sliding block body 20 has less strength and stiffness than the carrier part 15 and thus it provides for tolerance equalization and damping. The overall essentially cap-shaped sliding block body 20 has a peripheral wall 21 and an end wall 22 which adjoins one end of the peripheral wall 21. The inside of the end wall 22 adjoins the side of the wing 18 which is turned away from the support 14. The peripheral wall 21 is slotted in the lengthwise direction of the sliding block at 23 and in the transverse direction of the sliding block at 24.

Finally, a sliding cap 26 with a peripheral wall 27 and an end wall 28 which adjoins one side of the peripheral wall 27 is slipped onto the sliding block body 20. In the area of the narrow sides of the sliding block 11, the inner side of the peripheral wall 27 of the sliding cap 26 is in contact with the narrow sides of the carrier part 15, while the inside of the peripheral wall 27 in the area of the lengthwise sides of the sliding block is at a distance from the lengthwise sides of the carrier part 15. The rubber-elastic sliding block body 20 essentially fills the entire space between the carrier part 15 and the sliding cap 26. The wings 18 can have an essentially constant thickness over their entire length according to either embodiment, and can taper in a radially outward direction. Accordingly, the peripheral wall 21 of the sliding block body 20, in the area of the wings 18, has an essentially constant thickness (FIGS. 7 to 9) or this thickness increases in the direction toward the wing ends which lie away from the hub 17 (FIGS. 1 to 6). In both cases, the explained arrangement provides for the sliding cap 26 to be able to move to a limited degree using the elastic properties of the sliding block body 20 with reference to the carrier part 15 both in the transverse direction of the sliding block 11 and also in the direction of rotation around the axis 16 of the carrier pin 13. Moreover, the sliding block 11 can be compressed to a limited degree as a whole in the transverse direction, if the sliding cap 26 has limited elasticity. Conversely, the sliding cap 26 and the carrier part 15 engage one another in the lengthwise direction of the sliding block 11 essentially without play.

The inside of the end wall 28 adjoins the outside of the end wall 22 of the sliding block body 20. On the side of the peripheral wall 27, facing the support 14 in the area of the narrow sides of the sliding block 11, there are catch projections 29. The catch projections 29 lie against a shoulder 30 which is made on the side of the carrier part 15 facing the support 14. In this way, the carrier part 15, the sliding block body 20 and the sliding cap 26 are held securely together. The end wall 28 of the sliding cap 26 has a lengthwise slot 33.

The sliding cap 26 is preferably made of a plastic with good sliding properties and favorable noise behavior, for example, from polyethylene (PE) or polytetrafluorethylene (PTFE). High density polyethylene (HDPE), such as the material marketed under the trademark RIGIDEX®, is especially well suited for this purpose. The two lengthwise outer sides of the peripheral wall 27 of the sliding cap 26 form two opposite sliding surfaces 34, 35. If desired, the outside of the end wall 28 of the sliding cap 26 can be used as another sliding surface. Embossed stripper ribs 36, which run obliquely to the direction of displacement, are formed on the sliding surfaces 34, 35. The stripper ribs 36 provide, on the one hand, for linear contact of the sliding surfaces 34, 35 of the sliding block 11 with the sliding surfaces 41, 42 of the guideway 12, and on the other hand, they form a stripping means for dirt particles. The use of such stripping ribs is known and described in detail in German Patent DE 43 36 222 C1, so that the stripping ribs 36 and their function do not require further explanation.

Figure 7:
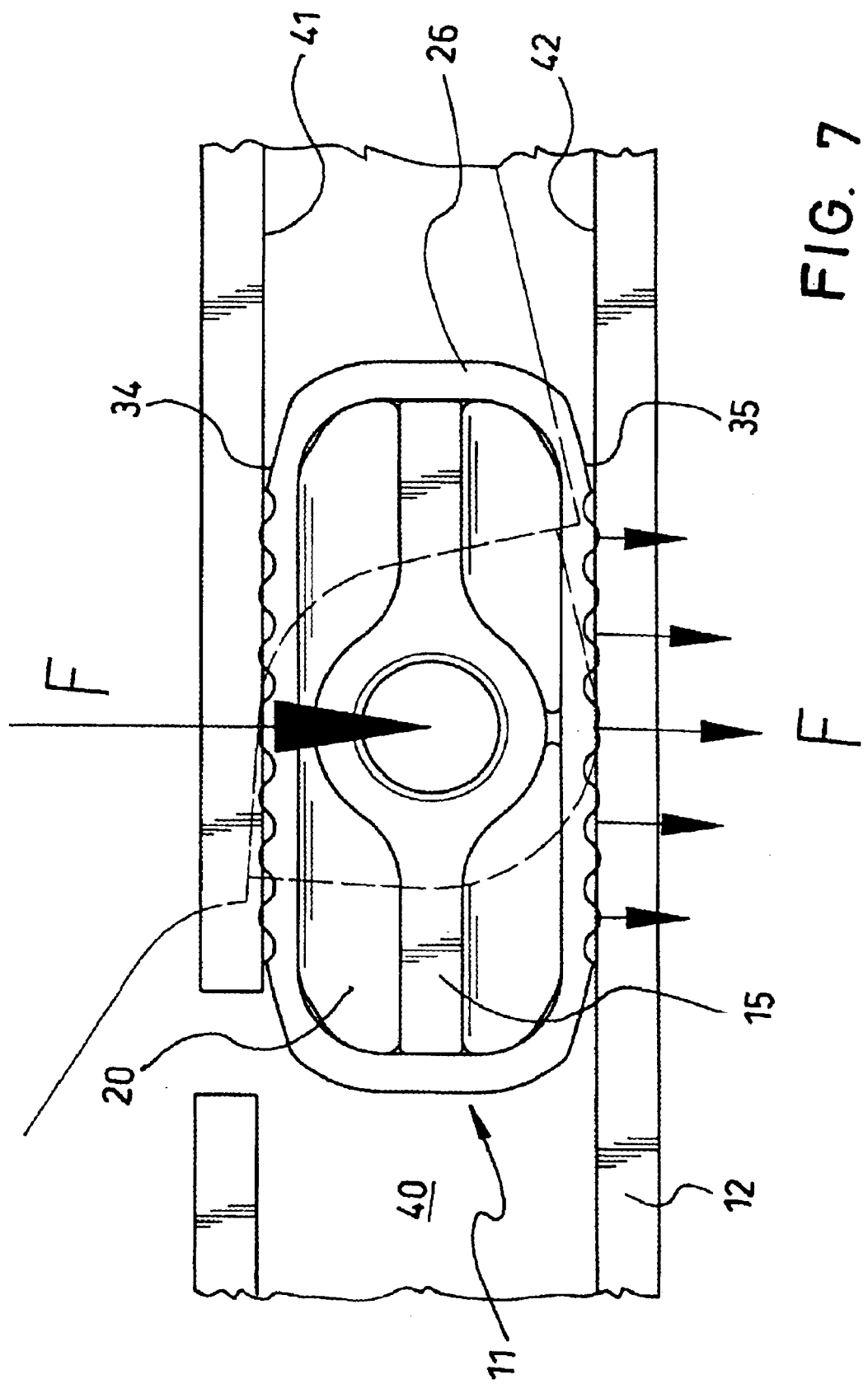
FIG. 7 is an enlarged side view of the sliding block guide as show in FIG. 1.

The guideway 12 has a guide channel 40 into which the sliding block 11 dips (FIGS. 7 to 9). Here, the sliding surfaces 34, 35 of the sliding block 11 are slide-engaged with the sliding surfaces 41, 42 of the guideway 12 (FIG. 7).

In the embodiment shown in FIGS. 1, 8 and 9 the sliding block guide 10 is part of the front lifting and displacement mechanism for the cover 45 of an openable motor vehicle roof 46. Here, the cover 45 can be raised by means of a corresponding mechanism and can be pushed over the roof surface, as is described in DE 100 33 887 C1 and corresponding U.S. Pat. No. 6,568,750. The support 14 which is connected to the support pin 13 of the sliding block 11 is attached to the bottom of the cover 45. The guideway 12 which is formed, for example, from at least one guide rail and/or guide slot is angled forward and down at its front area (which is on the left in FIGS. 8 & 9) so that there is a curved guideway area 49 between the front parallel guideway area 47 which runs obliquely essentially in a straight line and a parallel guideway area 48 which runs essentially horizontally in a straight line and which is located rearward in the lengthwise direction of the motor vehicle. The path of force F indicated in FIG. 7 proceeds from the cover 45 via the support 14 and the support pin 13 to the relatively strong carrier part 15. The carrier part 15 and the sliding block body 20 which surrounds it reduce the surface pressure between the sliding cap 26 and the sliding partner, i.e., the guide rail or guide slot which forms the guideway 12.

For passage of the sliding block 11 from one to another of the guideway areas 47, 48, 49 without problems even in long term operation, what is important is good curve handling capacity of the sliding block 11 in the guideway 12. The feature that the guideway 12 is widened in curved areas, such as the guideway area 49, also contributes to this curve handling capacity here, in addition to the above explained structure of the sliding block 11. This means that the width W' (FIG. 8) of the curved guideway area 49 is made larger than the width W of the parallel guideway areas 47 and 48 (FIGS. 8–9). The difference of the widths W' and W is preferably chosen such that the sliding block 11 is only pushed and turned, but not deformed, as it traverses the sequence of guideway areas 47, 48, 49, if the sliding block 11 and the guideway 12 have their theoretical dimensions. In the curve areas, then "triple-line support" of the sliding surfaces 34, 35 of the sliding block 11 on the sliding surfaces 41, 42 of the guideway 12 occurs. The deformation capacity of the sliding block 11 can be fully used for tolerance compensation which may become necessary.

The described sliding block guide enables high cover weights to be supported. The sliding block wears little over the service life of the system and it provides reliably for the absence of rattling of the system.

What is claimed is:

1. Sliding block guide for openable motor vehicle roofs or vehicle hatches, comprising:
    a guideway which has a guide channel, and
    a sliding block which is movably guided in the guide channel along the guideway and which has a rubber-elastic sliding block body and a sliding cap which is seated on the sliding block body,
    wherein a carrier part is disposed within the rubber-elastic sliding block body, has a greater strength and stiffness than the sliding block body and is pivotally supported for on a support pin.

2. Sliding block guide in accordance with claim 1, wherein the carrier part is made of plastic.

3. Sliding block guide in accordance with claim 2, wherein the support pin is made of metal and is incorporated in the plastic of the carrier part by the carrier part having been injection molded thereabout.

4. Sliding block guide in accordance with claim 2, wherein the carrier part is slipped onto the support pin.

5. Sliding block guide in accordance with claim 1, wherein the carrier part is made of metal and has been slipped onto the support pin.

6. Sliding block guide in accordance with claim 1, wherein the carrier part has a hub which surrounds the carrier pin and two wings which project essentially radially from opposite sides of the hub.

7. Sliding block guide in accordance with claim 1, wherein the sliding block body is essentially cap-shaped with a peripheral wall and an end wall which adjoins one side of the peripheral wall.

8. Sliding block guide in accordance with claim 7, wherein the sliding block body is slotted in an area of its peripheral wall.

9. Sliding block guide in accordance with claim 1, wherein the sliding block has an essentially rectanguloidal shape.

10. Sliding block guide in accordance with one claim 1, wherein the sliding block is mirror-symmetrical both in the lengthwise direction and also in the transverse direction.

11. Sliding block guide in accordance with claim 9, wherein the peripheral wall of the sliding block body is slotted in at least one of a lengthwise direction of the sliding block and a transverse direction of the sliding block.

12. Sliding block guide in accordance with claim 1, wherein the sliding cap is slipped onto the carrier part.

13. Sliding block guide in accordance with claim 9, wherein the sliding cap and the carrier part are connected to one another essentially without play in the lengthwise direction of the sliding block.

14. Sliding block guide in accordance with claim 13, wherein the sliding cap has a peripheral wall, with the carrier part resting against an inner side of the peripheral wall in an area of narrow sides of the sliding block.

15. Sliding block guide in accordance with claim 9, wherein the sliding cap is elastically movable with reference to the carrier part both in a transverse direction of the sliding block and also in a rotary direction around a axis of the support pin.

16. Sliding block guide in accordance with claim 15, wherein the sliding cap has a peripheral wall which is spaced at a distance from the inside of the carrier part in an area of the lengthwise sides of the sliding block.

17. Sliding block guide in accordance with claim 1, wherein the rubber-elastic sliding block body occupies essentially the entire space between the carrier part and the sliding cap.

18. Sliding block guide in accordance with claim 1, wherein sliding surfaces of the sliding cap which slide-engage sliding surfaces of the guide channel have integral stripping ribs which run obliquely to a displacement direction of the sliding block.

19. Sliding block guide in accordance with claim 1, wherein the guide channel is wider in an area of curved portions of the guideway than in essentially straight guideway areas.

20. Sliding block guide in accordance with claim 19, wherein the guide channel in the curved guideway portions is dimensioned such that the sliding block conforms to sliding surfaces of the guide channel without appreciable deformation even when the curved guideway portions are traversed.

* * * * *